D. WARNER.
Bit for Boring.
No. 67,825.
Patented Aug. 13, 1867.
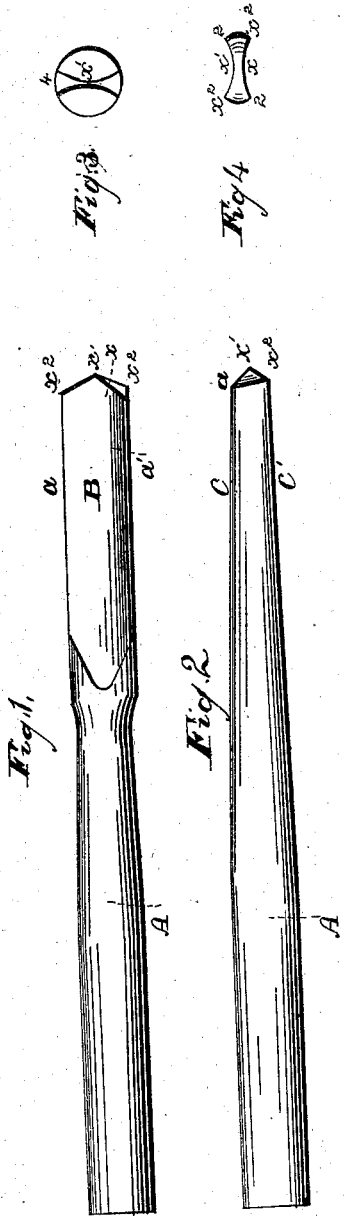

United States Patent Office.

DANIEL WARNER, OF PORT CLINTON, OHIO.

Letters Patent No. 67,825, dated August 13, 1867.

IMPROVEMENT IN DRILLS.

*The Schedule referred to in these Letters Patent and making part of the same.*

TO ALL WHOM IT MAY CONCERN:

Be it known that I, DANIEL WARNER, of Port Clinton, in the county of Ottawa, and in the State of Ohio, have invented certain new and useful Improvements in "Drills;" and do hereby declare that the following is a full, clear, and exact description thereof, reference being had to the accompanying drawings, and to the letters of reference marked thereon, making a part of this specification.

This drill is made of the usual material, having the ordinary stem for connecting it to the drilling machine. It is formed with two grooved sides, B, with the two cutting sides or edges, $c'$, longer than the guide sides $c$, and its end, with projecting points, $x^2$, being a little longer than the back points $z$. It will be seen that the drill is formed by bevelling each side $c\ c'$ just opposite to each other, and after forming the cutting point $x^1$ it is also bevelled on each side in a transverse manner. A drill thus formed is stronger than those now used, and is self-cleaning.

Having thus fully described my invention, what I claim as new, and desire to secure by Letters Patent, is—

The rod A, with its grooved sides B, cutting edges $c'$, guides $c$, bevelled points $x^2\ x^1$ and $z\ z$, for forming a drill in the manner and for the purposes set forth.

In testimony that I claim the foregoing I have hereunto set my hand this 30th day of March, 1867.

DANIEL WARNER.

Witnesses:
   O. E. NYE,
   A. F. LEPPER.